United States Patent [19]
Lisiecki

[11] Patent Number: 5,729,860
[45] Date of Patent: Mar. 24, 1998

[54] SCREEN WIPER ARM, ESPECIALLY FOR A MOTOR VEHICLE

[75] Inventor: Bruno Lisiecki, Chatillon, France

[73] Assignee: Valeo Systemes D'Essuyage, La Verriere, France

[21] Appl. No.: 828,966

[22] Filed: Mar. 27, 1997

[30] Foreign Application Priority Data

Mar. 29, 1996 [FR] France .................. 96 03966

[51] Int. Cl.$^6$ .................. B60S 1/34; B60S 1/32
[52] U.S. Cl. .................. 15/250.34; 15/250.352; 403/11; 403/12; 403/21
[58] Field of Search .................. 15/250.34, 250.351, 15/250.352, 250.31; 403/263, 258, 256, 247, 289, 11, 12, 21

[56] References Cited

U.S. PATENT DOCUMENTS

| 2,885,230 | 5/1959 | Terpin | 15/250.34 |
| 3,419,299 | 12/1968 | Oishei | 15/250.34 |

FOREIGN PATENT DOCUMENTS

| 2 640 211 | 6/1990 | France . |
| 1 099 875 | 2/1961 | Germany . |
| 44 08733 | 9/1995 | Germany . |
| 637671 | 5/1950 | United Kingdom . |

*Primary Examiner*—Gary K. Graham
*Attorney, Agent, or Firm*—Morgan & Finnegan, L.L.P.

[57] ABSTRACT

A screen wiper for a motor vehicle comprises a casing articulated on a head, which is secured by means of a prefitted nut on to the threaded terminal shank of the wiper drive spindle. The head has an aperture through which the threaded shank passes, and a circular base or washer portion is fixed to the nut. Around the aperture there is arranged a set of upstanding retaining lugs which extend parallel to the axis of the aperture, and which grip the base of the nut in such a way as to retain the nut centered on the aperture, but without preventing it from being able to rotate while being tightened on to the threaded shank.

9 Claims, 2 Drawing Sheets

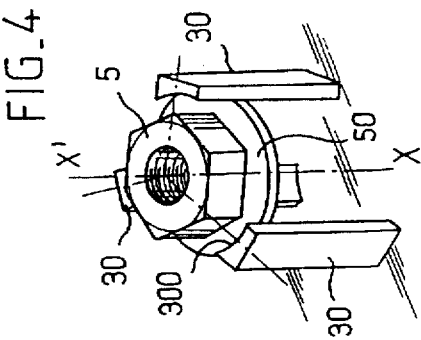
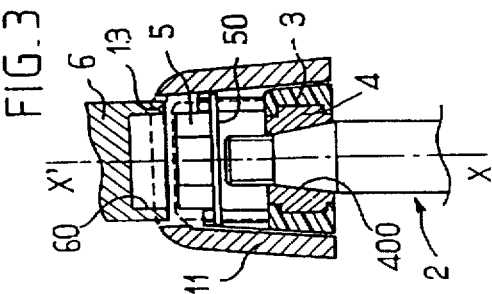
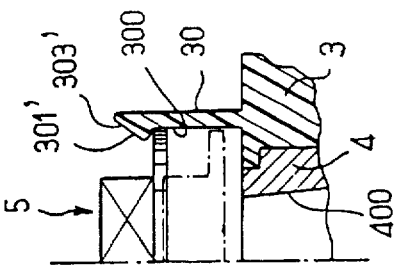
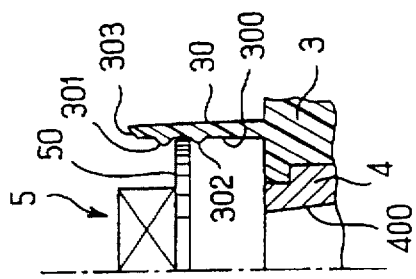
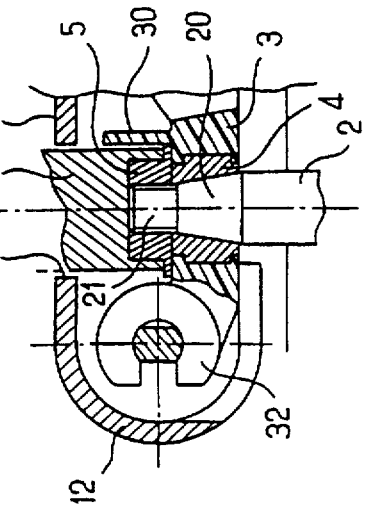

SCREEN WIPER ARM, ESPECIALLY FOR A MOTOR VEHICLE

FIELD OF THE INVENTION

The present invention relates to screen wiper arms, especially those for equipping a motor vehicle. In particular, the invention relates to a screen wiper arm of generally conventional type, comprising a casing which is articulated on a movable support element (normally referred to as a head), which is adapted to be fixed by means of a nut on the threaded shank or end portion of a drive spindle or control shaft, the latter being driven in oscillating or back-and-forth motion. The head has an aperture through which the threaded shank can pass, and this aperture has a conical form which is mated, when it is being fitted on to the spindle, on a conical portion of the latter which is adjacent to the threaded shank.

BACKGROUND OF THE INVENTION

Screen wiper arms are traditionally components which are manufactured by the equipment manufacturer and then supplied to motor manufacturers, who fasten them on to the drive spindles. In order to avoid any need for the nut to be handled during the fitting operation, and in order also to facilitate the performance of the tightening operation by automatic equipment, it has been proposed to mount the nut in the wiper arm beforehand, in such a way that the nut cannot be lost.

One system of this kind is described (by way of example) in French patent specification No. FR 2 640 211A, FIGS. 2 and 3 of which show the configuration of the nut and of the head that receives it.

The nut has a circular base in the form of a ring, which is adapted to be engaged in sliding movement within a housing that surrounds the aperture. This housing has lateral grooves which constitute slides for the base. After engagement, the entry flanges of the grooves are deformed by peening, so as to prevent the nut from escaping. The nut is thus imprisoned within its housing, coaxially with the aperture. The arm is delivered by the equipment manufacturer to the motor manufacturer with the nut prefitted in this way.

The above mentioned technique does however have a disadvantage, which is related to the fact that it is necessary to perform a special operation to retain the nut within its housing, by peening over the entry edges of the housing. This additional operation is of necessity costly. In addition, in quantity production the nut is placed in position by automatic means using a robot. This operation naturally has to be carried out before the operation of peening the edges. Then, in the event of poor synchronisation of the two operations, especially if the peening operation is carried out before the nut is put into position, this positioning operation can no longer be carried out. It is therefore necessary to reject the whole wiper arm assembly.

DISCUSSION OF THE INVENTION

The object of the invention is to overcome the above mentioned problem by proposing an arrangement in which positioning of the nut beforehand is carried out in a simple and reliable way, in which the nut is able to be removed and then put back in place correctly if any difficulty arises in fitting.

The invention accordingly relates in general to screen wiper arms which comprise a casing articulated on a head which is secured by a nut on the threaded end of a drive spindle that passes through an aperture in the head, the nut being fixed to a circular base by which it is prefitted and retained in place.

According to the invention, a screen wiper arm, especially for a motor vehicle, which comprises a casing articulated on a head which is adapted to be fixed by means of a nut on a threaded end portion of a drive spindle, the head having an aperture through which the said threaded end can pass, wherein the said nut is fixed to a base having a circular contour by means of which it is prefitted and retained in the head, substantially on the axis of the said aperture, and wherein, around the latter, a set of posts or retaining lugs is provided, these retaining lugs extending parallel to the said axis and gripping the said base in such a way as to retain the nut centred on the said aperture but without preventing the nut from being able to rotate while it is tightened on to the said threaded end portion, is characterised in that the said retaining lugs are provided with means for restraining axial movement of the said base, the said restraining means holding the nut spaced apart from the head.

The retaining lugs also allow the nut to be displaced axially once the tightening operation has been started. The nut is therefore able to be screwed on to the threaded portion, or shank, of the drive spindle by means of an appropriate tool, and in particular with the aid of an automatic tightening tool.

According to a preferred feature of the invention, the said retaining lugs have a concave inner face in the form of an arc of a cylinder complementary with the perimeter of the said base.

The said retaining lugs preferably enable the nut to slide axially; but this axial sliding movement of the nut is preferably limited, with the retaining lugs being provided at their free ends with a boss or bead which prevents the said base from escaping from between the retaining lugs. Such blocking means preferably consist of a pair of bosses or beads between which the peripheral edge of the said base is inserted.

The said aperture is preferably formed in a metallic insert around which the body of the head is moulded, the body being of plastics material, with the retaining lugs being moulded integrally with the body. The retaining lugs are preferably flexible, and they preferably have at their free ends a chamfer which facilitates placing of the base in position between the retaining lugs.

There are preferably three of these retaining lugs, spaced apart at 120 degrees about the axis of the aperture.

Further features and advantages of the invention will appear more clearly on a reading of the following detailed description of some preferred embodiments of the invention, which are given by way of non-limiting example only and with reference to the accompanying drawings.

BRIEF DESCRIPTION OF THE DRAWINGS

in FIG. 1, the screen wiper is seen in longitudinal cross section, in which the plane of the cross section passes through the axis of the drive spindle, and in the situation shown, which corresponds to the start of the operation of fastening the wiper arm on to the control spindle, the arm, with its nut prefitted, is positioned on the end of the spindle, and the tool head of the screw fastening tool is starting its approach.

FIG. 3 is a side view on FIG. 1, sectioned through a transverse plane passing through the axis of the control spindle.

FIG. 4 is a perspective view of the nut and its retaining lugs.

FIG. 5 is a view similar to part of FIG. 1, showing the situation at the end of the tightening operation.

FIG. 6 is a half view in axial cross section showing how the nut is retained by another embodiment of retaining lug.

FIG. 7 is a half view in axial cross section showing how the nut is retained by a further embodiment of retaining lug.

DESCRIPTION OF PREFERRED EMBODIMENTS OF THE INVENTION

Figure 1:
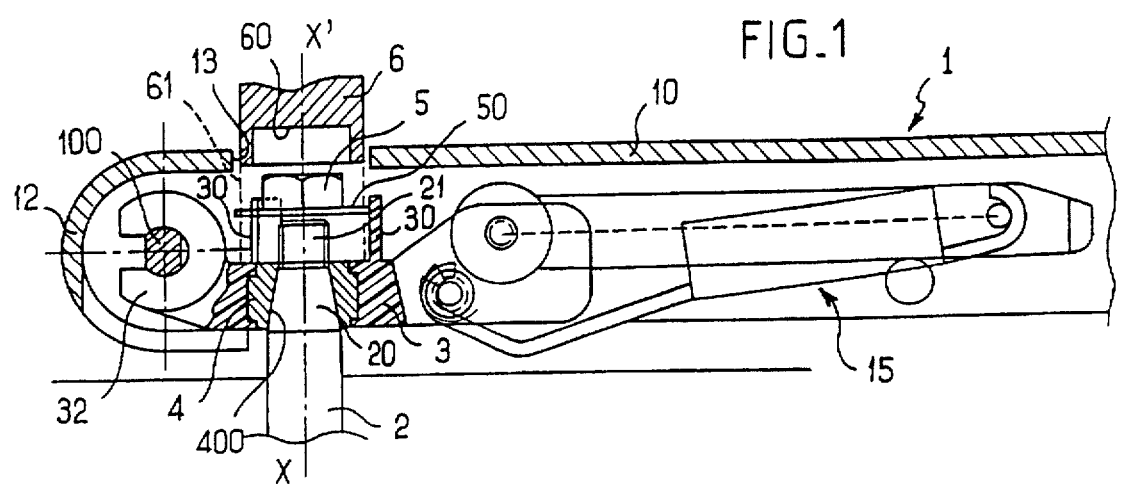
FIG. 1 is a partial diagrammatic general view of a screen wiper arm in accordance with the invention, and more precisely it shows that part of the arm which lies on the same side as its control spindle, the end of which is also shown.
Figure 2:
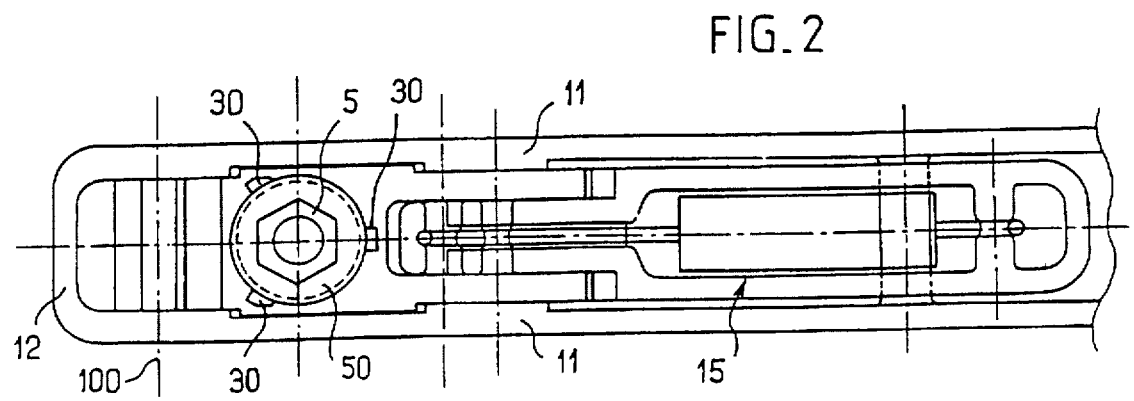
FIG. 2 is a top plan view on FIG. 1.

Reference is first made to FIGS. 1 to 3, in which a screen wiper arm for a motor vehicle is shown. The wiper arm comprises a casing 1 on which a wiper blade (not shown) is fitted. The blade is supported on the end (not shown) of the wiper arm to the right of FIGS. 1 and 2. In transverse cross section, the casing 1 is generally in the form of an inverted U, the upper portion of which is denoted by the reference numeral 10, while its side portions have the reference numeral 11. The curved end portion of the casing 1, beside the drive spindle, is designated by the reference numeral 12. Adjacent to this curved end, the casing carries a transverse pivot pin 100 by which the casing is articulated removably on an element 32, which is generally C-shaped in transverse cross section.

The C-shaped element 32 is part of a body, or head, 3 of plastics material, which also supports a resilient return means 15 which is coupled to the casing 1 and which is contained within the latter. The return means 15 is of a type known per se, and, in operation of the wiper, it applies the wiper blade against the windshield or rear window of the vehicle. It is however possible to lift the wiper arm 1 by causing it to pivot about the axis of the pivot pin 100, against the force exerted by the resilient return means 15. Again in a manner well known per se, the head 3 is formed by moulding on to a metallic insert or core 4 which has a frusto-conical aperture 400 with a small cone angle. The apex of this cone is directed towards the upper portion, or base, 10 of the casing 1, which is the upper part of the casing as seen in FIG. 1.

The insert 4 is adapted to enable the wiper arm to be mounted on the end of a control shaft or drive spindle 2, which is movable in pivoting back and forth motion. For this purpose, the spindle 2 has in its end portion a frusto-conical section 20 which nests within the aperture 400. The frusto-conical section 20 is extended by a threaded shank 21.

The wiper arm is fastened on the drive spindle 2 by means of a nut 5, which is prefitted in the wiper arm before the arm is delivered for assembly on the vehicle. The nut 5 is shown in perspective in FIG. 4, and is in the form of a conventional hexagonal nut having a base 50 in the form of a disc, i.e. a ring with a circular contour. The diameter of the ring 50 is slightly greater than the largest transverse dimension of the hexagonal part of the nut.

The nut is centred and retained by three centring and retaining elements 30 projecting on the top of the body 3. These elements 30 are in the form of bars, pillars or lugs; they extend parallel to the axis XX' of the aperture 400. Each lug 30 has a concave inner wall surface 300 in the form of an arc of a cylinder, centred on the axis XX' and complementary with the peripheral profile of the base 50. The three retaining lugs 30 are spaced apart at regular intervals, i.e. at 120 degrees, about the axis XX'. Their inner surfaces 300 lie at a distance from the axis XX' which is substantially equal to the radius of the circular base 50, this distance being such as to enable the latter to be fitted between the retaining lugs 30. However, in practice there is a negative radial clearance, such that the retaining lugs 30 exert on the base 50 some radial gripping force.

The retaining lugs 30 thus together form a chimney, in which the base 50 of the nut is intimately fitted and gripped, while the base 50 is able to slide in the chimney along the axis XX' while having to overcome some friction force. The retaining lugs 30 are made integrally by moulding with the body 3 of plastics material, of which they therefore form an integral part. They therefore have some flexibility due to the elasticity of the plastics material, and due to the fact that they are relatively slender.

Fitting of the nut 5 on the head 3 is carried out in a very simple and inexpensive way at the premises of the equipment manufacturer. The casing 1 having first been opened out by pivoting it about the pivot pin 100, so as to reveal the space in front of the head 3, the nut 5 is simply positioned by downward movement along the axis XX', and is inserted by slight force-fitting between the three retaining lugs 30. The wiper arm and its nut 5 can then be securely handled together, so as to be delivered to the motor manufacturer and put on the production line.

The actual operation of fitting the wiper arm on the spindle 2 is carried out using a socket tool head 6 of an automatic screw fastening machine. The tool 6 is engaged with the nut 5 through a hole 13 formed for this purpose in the upper portion 10 of the casing of the wiper arm. This hole 13 may be, and preferably is, closed once the fitting operation is completed, by means of an appropriate bung, for example of plastics material. The tool 6 has a hexagonal socket 60 matching the head of the nut 5, so as to screw the latter on to the threaded shank 21 of the drive spindle 2.

In FIG. 1, the outline of the fastening tool 6 during its downward displacement is indicated by the broken lines 61. At the beginning of the fastening operation, the wiper arm is placed on the end of the drive spindle 2, in such a way that the metallic insert or core 4 mates, through its frusto-conical aperture 400, on the frusto-conical portion 20 of the drive spindle. The pre-positioning of the nut 5 between the retaining lugs 30 corresponds normally to the situation shown in FIG. 1, in which the base 50 of the nut is retained between the upper parts of the retaining lugs. If this is not the case, and if the nut initially lies in a lower position, the shank 21 forces it upwards at the instant when the wiper arm is placed on the drive spindle 2. As a result, in all cases, the nut 5 lies above the threaded shank 21 at the instant when the tightening operation is begun. The height of the retaining lugs 30 is naturally made large enough for this positioning of the nut to be possible.

During the tightening operation, the tool 6 is moved downwards so as to engage with the hexagonal head of the nut 5, and is put into rotation. During its conjugate movement of rotation and axial downward movement, the base 50 slides frictionally against the inner surfaces 300 of the retaining lugs. At the end of the operation, the nut 5 is fully tightened on the threaded shank 21, and the arm is consequently fastened completely to its drive shaft 2, as shown in FIG. 5.

In the modified version shown in FIG. 6, a pair of bosses or beads 301, 302 are provided on the inner surfaces 300 of the retaining lugs 30. These bosses are arranged to trap the edge of the base ring 50 between them, so as to immobilise the nut against axial straight line movement.

The nut is thus, here, held in position at a certain predetermined spacing from the body 3 and the insert 4, this spacing being a distance which is equal to, or very slightly greater than, the length of the threaded shank 21. Thus any risk of the nut shaking loose and escaping during handling of the wiper arm is avoided. These bosses or beads 301 and 302 consist of slightly thickened portions which do not prevent the nut being placed in position correctly as it is prepositioned between the retaining lugs; nor do they prevent it from sliding downwardly during the tightening operation. The slight flexing of the retaining lugs during these two steps is sufficient to enable the edge of the nut base 50 to slide over the boss 302.

FIG. 6 also shows an entry chamfer 303 on the free ends of the lugs 30, to facilitate placing of the nut in position between the retaining lugs 30.

Reference is now made to FIG. 7 showing a further version. FIG. 7 the retaining lugs 30 are provided with a single boss or bead 301' of ratchet-tooth form in cross section. In this version, there is again an entry chamfer, designated by the reference numeral 303'.

In the various embodiments described above, the pivot pin 100 by which the casing of the wiper arm is articulated on the head 3 is situated on the other side of the axis XX' from the screen wiper blade. However, the present invention does of course equally apply to configurations in which the pivot axis 100 and the wiper blade are both situated on the same side of the axis XX', as for example in French patent specification No. FR 2 640 211A previously mentioned. In that case, the tightening tool 6 is not passed through the wiper arm casing 10, because the latter is not present in the region of the axis XX'. The tool may then be passed, for example, through an auxiliary housing or shroud which overlies the head 3 at this point, with the wall of this casing having an appropriate through hole which can be closed by a bung or the like at the end of the tightening operation.

In another possible arrangement, a removable shroud is provided in this region, this removable shroud constituting a cover and being adapted to be fixed on the head after fitting.

In the embodiment described above, a set of three retaining lugs 30 is provided. There may however for example be four retaining lugs disposed at 90 degree intervals, or more than four lugs. It is simply necessary that the number and configuration of the retaining lugs be such as to ensure correct positioning and guiding, parallel to the axis XX' and without risk of any tilting, of the base 50 and the nut 5 to which it is fixed.

What is claimed is:

1. In combination, a screen wiper arm with a drive spindle and a nut securing the wiper arm to the drive spindle, the drive spindle having a terminal threaded shank, the wiper arm comprising a head and a casing articulated on the said head, the head being secured on the said threaded shank by means of the nut, the head having an aperture through which the threaded shank can pass with said aperture defining an axis, the nut including a base having a circular contour by means of which the nut is prefitted and retained within the said head substantially on the said axis of the aperture, the arm further including a set of retaining lugs carried by the said head around the said axis, each said retaining lug extending parallel to the said axis and gripping, by friction the said base of the nut, so as to retain the nut centred on the said aperture but without preventing rotation of the nut during an assembly operation whereby the nut is tightened on to the said threaded shank, wherein the said retaining lugs include means for restraining axial movement of the said base, the said restraining means adapted to maintain the nut spaced apart from the said head prior to assembly.

2. The combination of claim 1, wherein each said retaining lug has a concave inner face in the form of an arc of a cylinder complementary to the periphery of the said base.

3. The combination of claim 1, wherein the said retaining lugs are adapted to yield so as to permit axial sliding movement of the nut during said tightening operation.

4. The combination of claim 3, wherein each said retaining lug has a projecting element at its free end to limit axial sliding movement of the nut and escape of the latter from the said retaining means.

5. The combination of claim 1, wherein the said restraining means comprise a pair of projecting elements spaced axially apart for retention of the edge of the said base between them.

6. The combination of claim 1, wherein the wiper arm further includes a metallic insert defining the said aperture therein, the head comprising a body of plastics material moulded on to the said metallic insert, the said retaining lugs being moulded integrally with the said body.

7. The combination of claim 1, wherein the said retaining lugs are flexible.

8. The combination of claim 7, wherein each said retaining lug has a chamfer at its free end.

9. The combination of claim 1, having three said retaining lugs spaced apart at 120 degrees about the said axis of the aperture.

* * * * *